Patented July 18, 1939

2,166,118

UNITED STATES PATENT OFFICE 2,166,118

INSECTICIDAL COMPOSITIONS CONTAINING HETEROCYCLIC AMIDES

Euclid W. Bousquet and Paul L. Salzberg, Wilmington, Del., assignors to E. I. du Pont de Nemours & Company, Wilmington, Del., a corporation of Delaware No Drawing. Application October 3, 1936, Serial No. 103,908

8 Claims. (Cl. 167—33)

This invention relates to compositions of matter which have properties rendering them useful as insect killers, repellants, and the like, and especially to insecticidal compositions containing carboxylic acid amides having a heterocyclic radical and an aliphatic hydrocarbon radical of at least six carbon atoms.

Heretofore pyrethrum extracts have been used for insecticidal purposes. They have excellent toxicity against flies but their high cost has prevented widespread use. Various synthetic products have been recommended as substitutes for pyrethrum extracts, but the utility of these substitutes is limited for practical purposes since their toxicity is so low that it is necessary to apply them alone or in such high concentrations as to leave objectionable residues, particularly when they are used on and around fabrics. Various fatty acid amides of low molecular weight have been used heretofore as emulsifying, wetting, and spreading agents, but they have not, to our knowledge, been employed successfully as ingredients of insecticidal compositions. Attempts have been made to impart insecticidal properties to these relatively low molecular weight amides through replacement of oxygen by sulphur and through introduction of mercury into the molecule, but objectionable properties such as low solubility, unpleasant odor, or lack of toxicity resulted. Solubilizing substituent radicals, such as sulfuric acid groups, have been introduced into certain carboxylic amides of low solubility in order to render them useful in liquid compositions, but the resulting compounds, although rendered useful as wetting or spreading agents, have not, to our knowledge, been employed as the essential toxic ingredient of insecticidal mixtures. Heretofore, the importance from the standpoint of insecticides of the combination, in a carboxylic acid amide, of a heterocyclic radical and an aliphatic hydrocarbon radical of high molecular weight, has not been recognized.

It is an object of the present invention to provide new and improved insecticides of high mortality value. Another object of the invention is to provide toxic substances which will increase the effectiveness of other insecticides. A further object is to provide toxic substances which can be used with other insecticides to provide compositions having a higher insecticidal efficiency than either constituent alone. Another object is to provide insecticides which have high toxic value in low concentration. Another object is to provide insecticides which will not leave objectionable residues on fabrics. Another object is to provide compounds which are comparable with or exceed pyrethrum extracts in mortality and paralytic value and are more readily available and economical to manufacture.

The above and other objects appearing hereinafter are accomplished by the following invention which comprises preparing by suitable methods and from appropriably selected ingredients, a carboxylic acid amide having a heterocyclic radical and an aliphatic hydrocarbon radical of at least six carbon atoms. The invention also comprises formulating into an insecticidal composition a carboxylic acid amide havng a heterocyclic radical and an aliphatic hydrocarbon radical of at least six carbon atoms. Such compositions have remarkably high toxicity toward lower forms of life. The objects of the invention are also accomplished by reacting morpholine with a carboxylic acid having an aliphatic hydrocarbon residue of at least six carbon atoms or an amide-forming derivative thereof, and isolating the resulting morpholide.

The above definition of the amide includes the following: amides in which the heterocyclic radical is attached to amido carbon, such as the n-dodecylamide of furoic acid; amides in which the heterocyclic radical is attached to amido nitrogen, such as the tetrahydrofurfurylamide of octanoic acid; and amides in which the amido nitrogen is a part of the heterocyclic radical, such as 4-(10,11-undecylenoylmorpholine) (the morpholide of 10,11-undecylenic acid), in which the amido nitrogen is only one of the heteroatoms of the heterocyclic radical, and 1-n-dodecanoyl-piperidine (the piperidide of n-dodecanoic acid), in which the amido nitrogen is the only heteroatom. The aliphatic hydrocarbon radical which may be saturated or unsaturated, branched or straight chain, acyclic or alicyclic, may be attached to amido nitrogen as in the n-dodecylamide of α-picolinic acid, or to amido carbon as in 4-n-dodecanoylmorpholine (the morpholide of n-dodecanoic acid).

In general, the amides employed in this invention may be made by reacting primary or secondary amines wtih carboxylic acids or amide-forming derivatives thereof such as halides and esters of the acid. The ingredients should be so selected as to result in an amide of the character already described, i. e. either the amine or the acid, or both, should contain a heterocyclic radical, and one or both should have an aliphatic hydrocarbon residue of at least six carbon atoms. Some of these amides, namely, the morpholides of carboxylic acids having an aliphatic hydrocarbon residue of at least six carbon atoms, have not to our knowledge heretofore been known and the present invention embraces in part these compounds and methods of making them.

The following examples are illustrative of the invention but it is to be understood that the invention is not limited thereto.

EXAMPLE I n-Dodecylamide of α-picolinic acid

A mixture of 17.1 parts of ethyl α-picolinate and 18.5 parts of n-dodecylamine was heated under reflux at 140° C. for six hours. Twenty-three parts of the white needle-like crystals of n-dodecylamide of α-picolinic acid melting at 44–45° C. were obtained by crystallization of the product from low-boiling petroleum hydrocarbons. These crystals on analysis showed a nitrogen content of 9.47% as compared to the calculated value of 9.64% for the n-dodecylamide of the α-picolinic acid.

EXAMPLE II

4-(10,11-undecylenoyl) morpholine

A solution of 30.4 parts of the acid chloride of 10,11-undecylenic acid in 60 parts of benzene was slowly added to a rapidly stirred mixture of 13 parts of morpholine, 60 parts of benzene and 70 parts of 10 per cent aqueous sodium hydroxide. The temperature during addition of the acid chloride solution was maintained below 60° C. The reaction was then continued for one hour after mixture of reagents was complete. The benzene layer was separated from the cooled reaction mixture and washed with water until neutral. On distillation, thirty-four grams of a colorless oil boiling at 175° C./2 m. m. were obtained which by analysis showed a nitrogen content of 5.55% as compared with the calculated value of 5.77% for 4-(10,11-undecylenoyl) morpholine.

This compound when placed on the tongue produced a burning sensation with a certain degree of numbness.

EXAMPLE III

1-n-dodecanoylpiperidine

A mixture of 40 parts of n-dodecanoic acid, 17 parts of piperidine and 60 parts of m-cresol was heated at 195–200° C. for six hours. The water formed during the reaction was continuously removed through distillation. At the end of the above period, the cresol was removed by distillation in vacuo. The residue was dissolved in ether and the ethereal solution washed first with aqueous sodium carbonate solution and then with water, after which it was dried over anhydrous sodium sulfate. On distillation of the dried ethereal solution, 20 parts of a colorless oil boiling at 173–175° C./1.5 m. m. were obtained which upon analysis showed a nitrogen content of 5.12% as compared to the calculated value of 5.25% for 1-n-dodecanoylpiperidine (piperidide of n-dodecanoic acid).

EXAMPLE IV

Dimorpholide of sebacic acid

A closed vessel containing a mixture of 29 parts of diethyl sebacate and 25 parts of morpholine was heated at 165° C. for 16 hours. The vessel was then opened and the contents subjected to distillation. The dimorpholide of sebacic acid was collected as the fraction boiling at 194–197° C./1 m. m. This compound was a white crystalline solid at ordinary temperatures.

EXAMPLE V

4-n-dodecanoylmorpholine

A solution of 26.2 parts of n-dodecanoyl chloride in 40 parts of benzene was slowly added to a stirred mixture of 10.5 parts of morpholine, 60 parts of benzene and 60 parts of 10 percent aqueous sodium hydroxide. The temperature during addition of the acid chloride solution was kept below 60° C. The reaction was continued for an hour after mixing the reagents. The benzene layer, after separation from the cooled reaction mixture, was thoroughly washed with water. On distillation, 26 parts of a colorless oil boiling at 175° C./2 m. m. were obtained. Analysis of this oil showed a nitrogen content of 5.17% as compared to the calculated value of 5.20% for the 4-n-dodecanoylmorpholine. This compound when placed on the tongue produced a mild burning sensation and slight numbness.

EXAMPLE VI

One part by weight of 1-n-dodecanoylpiperidine (piperidide of n-dodecanoic acid) was dissolved in 400 parts by weight of kerosene (0.25% by weight). This solution was an excellent insecticidal spray, was practically colorless and upon spraying did not leave an objectionable odor or residue. When it was applied to flies, about 90% of the flies were paralyzed at the end of ten minutes and over 60% were dead at the end of 24 hours. As compared to a highly concentrated pyrethrum extract composition containing 0.125 gram of pyrethrins per 100 cc. of kerosene, these tests, made in accordance with the standard Peet-Grady specification, showed a relative efficiency of over 90%.

EXAMPLE VII

A kerosene solution containing 1% by weight of 1-n-dodecanoylpiperidine was made and applied to flies by spraying. The solution was practically colorless and left no perceptible residue upon spraying. The mortality value of this composition was superior to the pyrethrum-kerosene composition described in Example VI, being practically equal to the standard pyrethrum extract composition in paralytic value (see Table II below).

EXAMPLE VIII

Equal parts by weight of the n-dodecylamide of α-picolinic acid, casein, glue and straw oil were thoroughly mixed in an earthenware crock, about 0.2% of sodium n-dodecyl sulfate being added as an emulsifying agent. When emulsified in water, this composition was effective as a stomach poison for leaf-eating insects.

A composition similar in appearance, properties, and effect was obtained by substituting the dodecylamide of furoic acid for the dodecylamide of α-picolinic acid.

EXAMPLE IX

A dusting composition was made by mixing about 90% by weight of powdered talc and 10% of the dodecylamide of α-picolinic acid. This composition was applied with toxic effects to such chewing insects as the Mexican bean beetle, the codling moth, and the oriental fruit moth.

The remarkable synergistic effect of the amides with which this invention is concerned is shown by the following example:

EXAMPLE X

A solution of 25 m. g. pyrethrins in 100 c. c. of kerosene, to which had been added 0.5 gram of 1-n-dodecanoylpiperidine, was sprayed on flies. At the end of 24 hours, 65% of them were dead. Similar tests with a corresponding solution of pyrethrins alone (25 mg./100 c. c.) resulted in a kill of only 45.4%. Both percentages are the average of 10–12 tests.

Other typical amides illustrative of this invention, and the substances from which they may be made, are given in the following table:

Table I

| Amide | Amine | Acid or equivalent |
|---|---|---|
| Dodecylamide of furoic acid | n-Dodecylamine | Ethyl furoate. |
| Tetrahydrofurfurylamide of octanoic acid | Tetrahydrofurfurylamine | Octanoyl chloride. |
| Thiodiphenylamide of n-dodecanoic acid | Thiodiphenylamine | n-Dodecanoyl chloride. |
| 4-oleylmorpholine | Morpholine | Oleic acid. |
| 1-heptanoylpiperidine | Piperidine | Heptanoic acid. |
| 1-n-dodecanoyldecahydroquinoline | Decahydroquinoline | n-Dodecanoylchloride. |
| Piperidides of linseed oil acids | Piperidine | Linseed oil. |
| Morpholides of China-wood oil acids | Morpholine | China-wood oil. |
| Morpholides of soya bean oil acids | ...do... | Soya bean oil. |
| Morpholide of hexahydrophthalic acid | ...do... | Hexahydrophthalic anhydride. |
| Hexylamide of nicotinic acid | Hexylamine | Ethyl nicotinate. |
| Decylamide of tetrahydrofuroic acid | Decylamine | Methyl tetrahydrofuroate. |
| 5-ethoxybenzthiazyl-1-amide of octanoic acid | 5-ethoxy-1-amino-benzothiazole | Octanoic acid. |
| 1-octanoyl-2-(3-pyridyl) piperidine | Neonicotine | Do. |
| | Hydrogenated nicotines | Do. |
| | Hydrogenated nitrogen bases from shale oil distillation. | Do. |
| Dimorpholide of suberic acid | Morpholine | Dibutyl suberate. |
| Dimorpholide of azelaic acid | ...do... | Azelaic acid. |
| 4-ricinoleylmorpholine | ...do... | Castor oil. |
| 4-(12-hydroxystearyl) morpholine | ...do... | Hydrogenated castor oil. |

In preparing the insecticidal compositions of this invention, there is used at least one carboxylic acid amide having a heterocyclic radical and an aliphatic hydrocarbon residue of at least six carbon atoms. This amide is generally, though not necessarily, employed in conjunction with one or more other liquid or solid insecticidal or non-insecticidal substances, such as the type of substances commonly used in formulating insecticidal compositions. Such substances are numerous and only the following few are mentioned as typical: kerosene, gasoline, pyrethrum, derris, talc, thiocyanates, phthalates, and pine oil. The resulting compositions may be liquids, semi-liquids, or comminuted solids, as needed and desired, by appropriate selection of the amide and/or the added substances. Such compositions may be used generally for pest control purposes and destruction of lower forms of life. They may, for instance, be used as fly sprays for which purpose they are particularly effective, as stomach poisons for leaf-eating insects, and as contact insecticides for sucking insects.

Fly sprays containing the amides may be made simply by dissolving the amide in kerosene or similar petroleum product, in which liquids the amides have as a rule a good and sufficient solubility. Satisfactory concentrations of the amide are about 0.1% to about 5.0% though larger amounts may be used if desired and the more effective amides may be used in smaller amounts. The low concentrations are preferred where the toxicity of the amide is sufficiently high since they are more economical and minimize the residue on materials, such as fabrics, where such may be objectionable. This, however, is not in general a serious matter because the amides do not have appreciable odor at the concentrations, pressures and temperatures under which they are employed.

In general it may be stated that monocarboxylic acid amides in which the heavy aliphatic hydrocarbon radical is attached to the amido carbon, and in which the amido nitrogen atom is a part of the heterocyclic radical, are preferred where greater toxicity, lower volatility, less offensive odor, high solubility in kerosene and mineral oils, and higher synergistic power are desired. Of these, the 4-acylmorpholines, such as 4-n-dodecanoyl- and 4-undecylenoylmorpholine, through their pungent taste and irritant properties are preferred as being most effective as insect repellants as well as killers.

The high efficiency as insecticides of the amides of this invention is further illustrated in Table II below. This table gives the relative efficiency against flies of kerosene solutions of the amides, in terms of percentage of the values obtained with a standard pyrethrum extract containing 125 mg. of pyrethins per 100 c. c. of kerosene. Tests were made on the same day in order to eliminate variations in the resistance of the flies. Relative paralytic values are indicated in the column entitled "Down", and mortality values in the column entitled "Kill". The tests were conducted in accordance with the standard Peet-Grady specifications.

Table II

| Compound | Concentration in kerosene | 10 min. down | 24 hour kill |
|---|---|---|---|
| | Percent | | |
| 1-n-dodecanoylpiperidine | 0.25 | 90.5 | 92.6 |
| | 1.00 | 94.6 | 109.5 |
| n-Dodecylamide of α-picolinic acid | Saturated* | 82.3 | 95.7 |
| 4-(10,11-undecylenoyl) morpholine | 1.00 | 83.7 | 99.0 |
| Dimorpholide of sebacic acid | 1.00 | 57.6 | 28.1 |
| n-Dodecylamide of furoic acid | Saturated* | 82.3 | 95.7 |

*Less than 5%.

It is to be understood that the other amides of the type described have insecticidal properties, and other compositions besides those specifically mentioned are contemplated, and are within the scope of this invention. When used in conjunction with other substances the compositions may contain other liquid or dry substances than those mentioned, and various proportions thereof may be used. The insecticidal compositions may contain non-insecticidal or other insecticidal substances as carriers. As still other modifications of the invention may be made, no limitations to the annexed claims are intended except those which are specifically recited or are imposed by the prior art.

We claim:

1. An insecticidal composition containing a neutral carboxylic acid amide having a heterocyclic radical and an aliphatic hydrocarbon residue of at least six carbon atoms.

2. An insecticidal composition containing a carboxylic acid amide having an aliphatic hydrocarbon radical of at least six carbon atoms attached to the amido carbon, and in which the amido nitrogen is a part of a heterocylic radical.

3. An insecticidal composition containing a morpholide of a carboxylic acid having an aliphatic hydrocarbon residue of at least six carbon atoms.

4. An insecticidal composition containing 4-(10,11-undecylenoyl) morpholine.

5. A fly-spray comprising kerosene and 4-(10,11-undecylenoyl) morpholine.

6. An insecticidal composition containing a neutral carboxylic acid amide of a mono-amine having a heterocyclic radical and an aliphatic hydrocarbon residue of at least six carbon atoms.

7. An insecticidal composition comprising 1-n-dodecanoylpiperidine.

8. An insecticidal composition comprising n-dodecylamide of furoic acid.

EUCLID W. BOUSQUET.
PAUL L. SALZBERG.